J. LEVIN.
MACHINE FOR EXTRACTING JUICE FROM FRUIT.
APPLICATION FILED JAN. 3, 1920.

1,349,839.

Patented Aug. 17, 1920.
2 SHEETS—SHEET 1.

Inventor:
Jacob Levin
by his attorney,
Charles H. Gooding

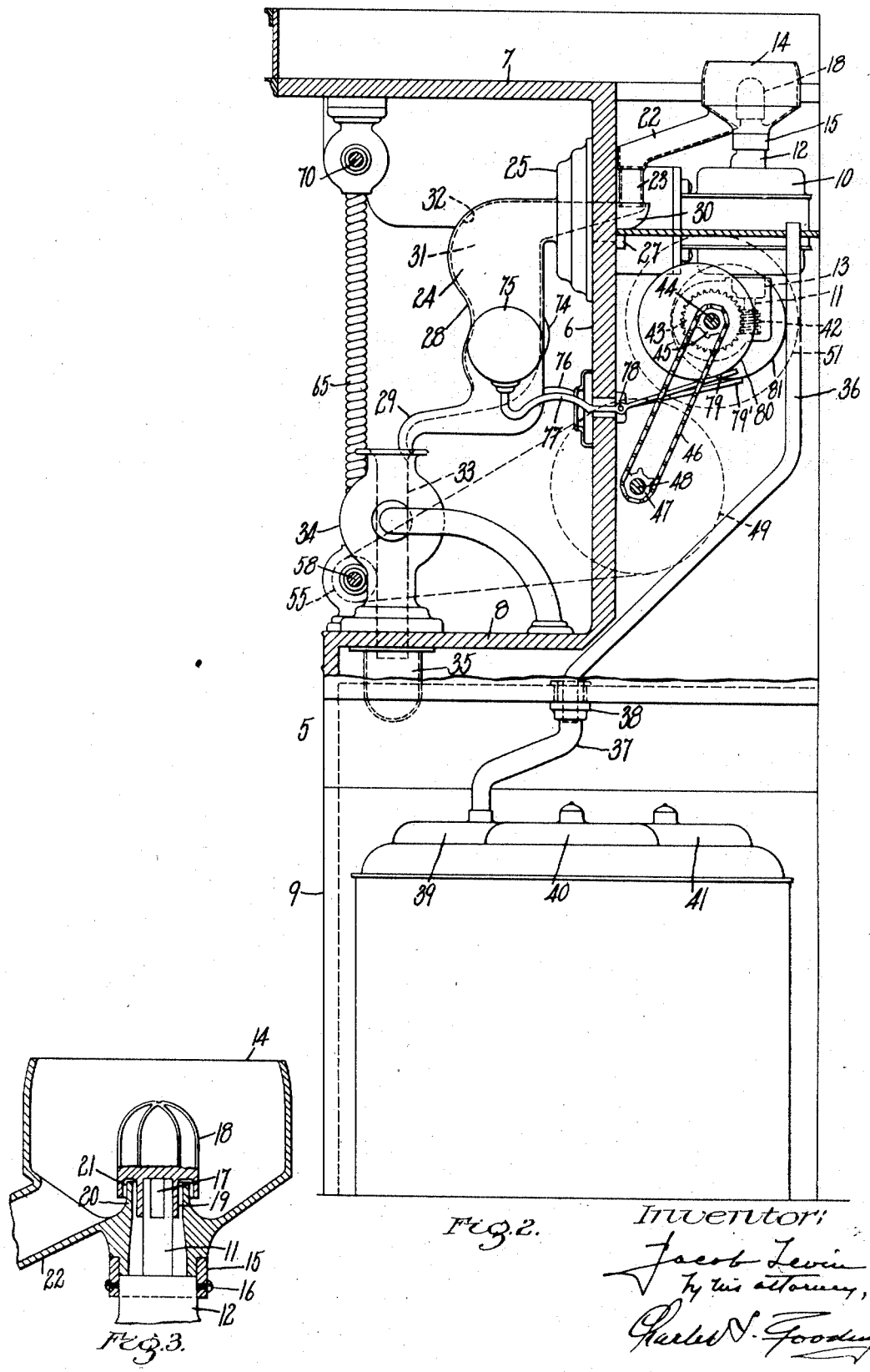

UNITED STATES PATENT OFFICE.

JACOB LEVIN, OF SPRINGFIELD, MASSACHUSETTS.

MACHINE FOR EXTRACTING JUICE FROM FRUIT.

1,349,839.  Specification of Letters Patent.  Patented Aug. 17, 1920.

Application filed January 3, 1920. Serial No. 349,134.

*To all whom it may concern:*

Be it known that I, JACOB LEVIN, a citizen of Russia, residing at Springfield, in the county of Hampden and State of Massachusetts, have invented new and useful Improvements in Machines for Extracting Juice from Fruit, of which the following is a specification.

This invention relates to machines for extracting juice from fruit and the object of the invention is to provide a machine of this class which is simple and efficient in its operation, easily operated, easy to take apart for cleansing purposes and of an attractive appearance, so that the same may be used wherever soft drinks are dispensed, particularly at summer resorts, amusement parks and fair-grounds, and be attractive and ornamental for such places.

The object of the invention is further to provide a machine which will attract the attention of the public to the juice which is being extracted from oranges or other fruit and this end is attained by having in the center of the machine a stream of orange juice pouring downwardly and visible to the eye, this stream of orange juice being surrounded by a frame-work of a plurality of rotating spirally-formed shafts, preferably four in number, thus forming a sort of picture frame with the cascade of orange juice forming the center of the picture. The attention of the public is further drawn to the device and to the fact that orange juice is being supplied for drinks by a pair of illuminating fixtures, one on each side of the orange juice conveyer, the machine being so constructed as to impart an up and down movement to these illuminating fixtures or electric lamps.

The invention consists in the combination and arrangement of parts set forth in the following specification and particularly pointed out in the claims.

Referring to the drawings:

Fig. 2 is a sectional elevation taken on line 2—2, Fig. 1.

Fig. 3 is a sectional elevation taken through the center of the hopper, also broken away.

Like numerals refer to like parts throughout the several views of the drawings.

Figure 1:
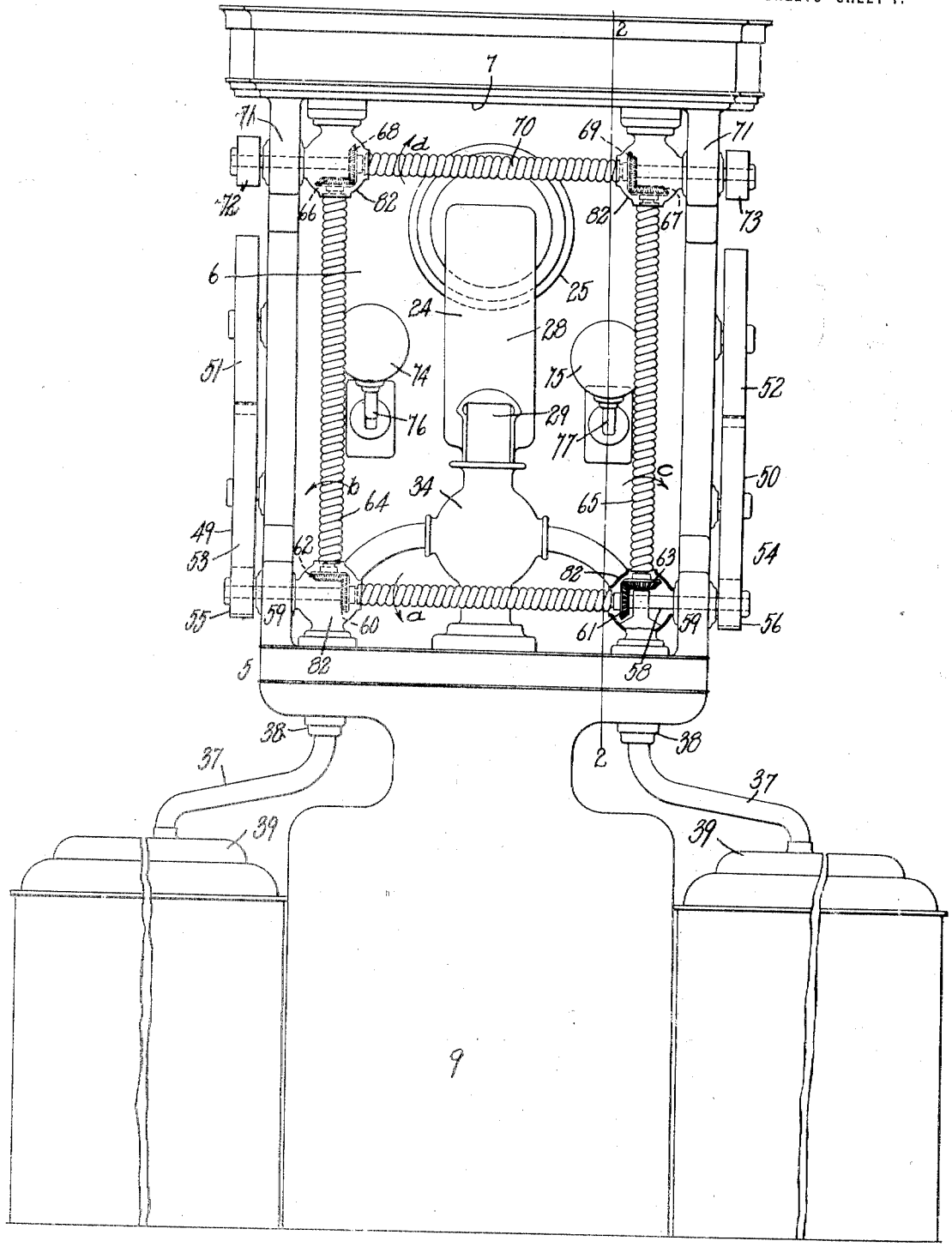
Figure 1 is a front elevation of my improved machine for extracting juice from fruit, portions being broken away to save space and for purposes of illustration.

In the drawings, 5 is the casing of the machine, 6 is a vertical back-plate for said casing, 7 is a top plate, 8 is an intermediate plate representing a shelf, 9 is the base of the machine, 10 is an electric motor having a vertically-positioned shaft 11 which rotates in bearings 12 and 13.

A hopper 14 has a collar 15 fastened to its lower end and this collar is fastened by screws 16 to the exterior of the upper bearing 12. The shaft 11 projects upwardly beyond it bearing 12 and is flatted off at its upper end at 17 to receive a reamer 18 which has a downwardly projecting hub 19 provided with a hole similarly shaped to fit the flatted upper end of the shaft 11. The bottom of the hopper 14 has an annular flange 20 projecting upwardly into an annular recess 21 in the bottom of the reamer 18. The hopper 14 has a spout 22 leading out of the bottom thereof and terminating at its outer end in a vertical portion 23.

In front of the back-plate 6 and substantially centrally positioned in the machine is a juice conveyer 24 which has an annular bracket 25 thereon adapted to bear against the front face of the back-plate 6 and a downwardly extending lug 27 adapted to bear against the rear face of the back-plate 6. The conveyer 24 consists of a vertical portion 28 which terminates at its lower end in a spout 29 and at its upper end in a horizontal rearwardly-extending portion 30. The spout 29 is open on the top thereof and the horizontal portion 30 is open on that portion of the top thereof which projects beyond the rear face of the back-plate 6. The vertical terminating portion 23 of the hopper spout is located above and in alinement with the open top of the horizontal portion 30.

The conveyer 24 is provided with a chamber 31 which extends from the top to the bottom of said conveyer and the inner face 32 of the front wall of said conveyer at the upper portion of said conveyer is concave, so that the juice, as it flows from the spout downwardly through the conveyer, if in large quantity, will strike this concave surface 32 and be directed downwardly toward the outlet spout 29 of the conveyer. Moreover, the curved inner surface 32 of the conveyer renders it easy to thoroughly cleanse the same. The spout 29 opens into a pipe 33 leading downwardly through an ornamentally shaped vase 34 which rests upon the shelf 8; said pipe 33 empties into a receptacle 35 fastened to the underside of the shelf 8.

A pipe 36 in the rear portion of the machine empties into a flexible pipe 37 which at its upper end is rotatably mounted upon a union 38 which is fastened to the frame of the machine, whereby the upper end of the pipe 37 is supported from the frame of the machine and the lower end of the pipe 36 empties into the pipe 37; the lower end of the pipe 37 is adapted to be connected to any one of three receptacles, 39, 40 or 41, and this portion of the apparatus is duplicated on opposite sides of the machine.

The lower end of the motor shaft 11 has a worm 42 fast thereto and which meshes with a worm gear 43 fast to a shaft 44 rotatably mounted in bearings on the frame of the machine. The shaft 44 has a sprocket gear 45 fast thereto which drives a sprocket chain 46, said sprocket chain at its lower end engaging a sprocket gear 47 fast to a shaft 48, rotatably mounted in the frame of the machine. The shaft 48 has fastened to its opposite ends on the outside of the frame of the machine pulleys 49 and 50. The shaft 44 has fastened to its opposite ends pulleys 51 and 52. The pulleys 49 and 50 are connected by belts 53 and 54 to pulleys 55 and 56 respectively, which are fastened to a horizontal shaft 58, journaled to rotate in bearings 59 on the frame of the machine. The shaft 58 has fastened thereto bevel gears 60 and 61 which mesh into bevel gears 62 and 63 respectively. The bevel gears 62 and 63 are fastened to vertical shafts 64 and 65 respectively. The shafts 64 and 65 have fastened to their upper ends bevel gears 66 and 67 which mesh respectively with bevel gears 68 and 69, these latter gears being fastened to a horizontal shaft 70 which is rotatably mounted in bearings 71 on the frame of the machine. The opposite ends of the shaft 70 have pulleys 72 and 73 fastened thereto. The shafts 58, 64, 65 and 70 have a spiral formation and are made of highly polished or plated metal to add to the appearance of the machine and to attract attention. Each pair of bevel gears 61, 63; 60, 62; 66, 68; and 67, 69 are inclosed in a casing 82.

Upon opposite sides of the conveyer 24 are located illuminating fixtures 74 and 75 which are mounted upon brackets 76 and 77 constituting levers which are pivoted at 78 to the frame of the machine and which have rearwardly extending arms 79 and 79' which bear against eccentrics 80 and 81 respectively fast to the shaft 44. Said eccentrics are set 180 degrees apart, so that as the shaft 44 is rotated, the eccentrics 80 and 81 will move the arms 79 and 79' and cause the fixtures 74 and 75 to rock the same alternately upwardly and downwardly, the fixture 74 moving upwardly as the fixture 75 moves downwardly and vice versa, thus still further attracting the attention of passersby to the machine.

The general operation of the machine hereinbefore specifically described is as follows:

The motor imparts a rotary motion to the shaft 11; the operator of the machine holds a divided orange against the reamer 18—this extracts the juice from the divided orange which pours downwardly into the hopper 14 and from the hopper the juice flows along the spout 22 and downwardly from the vertical lower end 23 of said spout into the open top of the horizontal portion 30 of the conveyer 24. The juice passes down through the chamber 31 of the conveyer and outwardly along the spout 29 which being open, renders the juice visible to spectators viewing the machine. From the spout 29 the juice passes through the pipe 33 into the receptacle 35; when this receptacle is filled, it is detached from the shelf 8, the juice is then preferably somewhat diluted and sweetened and then is poured through the pipes 36 from which it passes into the pipes 37 and thence into one of the receptacles 39, 40 or 41 on opposite sides of the machine.

While the juice is flowing through the spout 29, the spiral shafts 58, 64, 65 and 70 are kept continuously rotating in the direction of the arrows $a$, $b$, $c$, and $d$, Fig. 1. The gears by which the shafts are rotated are however concealed by the casings 82 in which they are inclosed and this rotary motion of the spiral shafts produces an optical illusion due to the concealment of the gears in the casings, said illusion causing it to appear as if the spiral shafts were traveling from one shell to another in a horizontal and vertical direction.

I claim:

1. A machine for extracting juice from fruit having, in combination, a casing embodying a vertical back-plate, a juice conveyer comprising a main body portion provided with a chamber extending therethrough and terminating at its lower end in a spout with an open top, the upper end of said conveyer terminating in a horizontal portion extending through said back-plate and open at the top and means to fasten said conveyer to said back-plate, means to extract juice from fruit and means to convey said juice to the open top of said conveyer.

2. A machine for extracting juice from fruit having, in combination, a casing embodying a vertical back-plate, a juice conveyer comprising a main body portion provided with a chamber extending therethrough and terminating at its lower end in a spout with an open top, the upper end of said conveyer terminating in a horizontal portion extending through said back-plate and open at the top, means to fasten said conveyer to said back-plate and a receptacle for liquid fast to said casing beneath and in alinement with said spout, means to extract juice from fruit and means to convey said juice to the open top of said conveyer.

3. A machine for extracting juice from fruit having, in combination, a casing embodying a vertical back-plate, a juice conveyer comprising a main body portion provided with a chamber extending therethrough and terminating at its lower end in a spout with an open top, the upper end of said conveyer terminating in a horizontal portion extending through said back-plate and open at the top and an annular bracket on said horizontal portion of said conveyer adapted to bear against the front face of said back-plate, means to extract juice from fruit and means to convey said juice to the open top of said conveyer.

4. A machine for extracting juice from fruit having, in combination, a casing embodying a vertical back-plate, a juice conveyer comprising a main body portion provided with a chamber extending therethrough and terminating at its lower end in a spout with an open top, the upper end of said conveyer terminating in a horizontal portion extending through said back-plate and open at the top, an annular bracket on said horizontal portion of said conveyer adapted to bear against the front face of said back-plate and a lug on said horizontal portion adapted to bear against the rear face of said back-plate, means to extract juice from fruit and means to convey said juice to the open top of said conveyer.

5. A machine for extracting juice from fruit having, in combination, a casing embodying a vertical back-plate, a juice conveyer comprising a main body portion provided with a chamber extending therethrough and terminating at its lower end in a spout with an open top, the upper end of said conveyer terminating in a horizontal portion extending through said back-plate and open at the top, means to fasten said conveyer to said back-plate, a hopper located at the rear of said back-plate, a spout leading out of said hopper and terminating at its outer end above the open top of the horizontal portion of said conveyer and means in said hopper adapted to extract juice from fruit.

6. A machine for extracting juice from fruit having, in combination, a casing embodying a vertical back-plate, a juice conveyer comprising a main body portion provided with a chamber extending therethrough and terminating at its lower end in a spout with an open top, the upper end of said conveyer terminating in a horizontal portion extending through said back-plate and open at the top and means to fasten said conveyer to said back-plate, the front inner wall of said conveyer opposite said horizontal portion being concave, means to extract juice from fruit and means to convey said juice to the open top of said conveyer.

In testimony whereof I have hereunto set my hand in presence of two subscribing witnesses.

JACOB LEVIN.

Witnesses:
 SAM FISHMAN,
 JACO C. KLEIN.